United States Patent Office 2,944,062
Patented July 5, 1960

2,944,062

CERTAIN ALPHA (1-DIETHYLAMINOETHYL) BENZIMIDAZOLYL (2), ALPHA-ARYL ACETAMIDES

Karl Hoffmann, Binningen, and Alfred Hunger, Basel, Switzerland, assignors to Ciba Pharmaceutical Products Inc., Summit, N.J., a firm No Drawing. Filed June 19, 1958, Ser. No. 743,005

Claims priority, application Switzerland July 17, 1957

6 Claims. (Cl. 260—309.2)

The present invention relates to α-[1-(lower tertiary amino-lower alkyl)-benzimidazolyl-(2)]-α-phenylacetamides and to their salts. The invention relates particularly to benzimidazolyl compounds of the formula

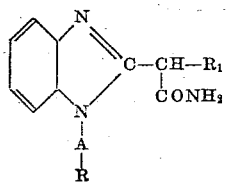

in which A represents a lower alkylene radical, more especially ethylene, and R represents a lower alkyleneimino group which may be interrupted by a hetero atom, such as a piperidino, pyrrolidino or morpholino group, and more especially a di-lower alkyl-amino group, above all the diethyl-amino group, in which formula $R_1$ is a phenyl radical which is unsubstituted or substituted in the 3-position and/or the 4-position, more especially in the 4-position, by halogen or a lower alkyl or lower alkoxy group, and their salts.

The new compounds have good analgesic action and can thus be used as analgetics.

Particularly valuable are the acetamides of the formula

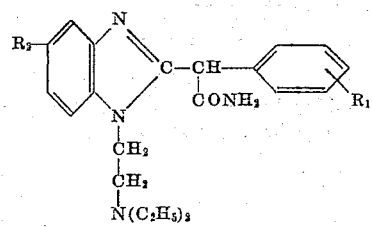

in which $R_1$ represents hydrogen, halogen, a lower alkyl or lower alkoxy group, and $R_2$ represents hydrogen or the nitro group, above all α-[1-(β-diethylamino-ethyl)-5-nitrobenzimidazolyl-(2)]-α-phenyl-acetamide, α - [1 - (β-diethylamino - ethyl)-5-nitrobenzimidazolyl-(2)]-α-(parachlorophenyl) - acetamide, and α - [1 - (β - diethylaminoethyl) - benzimidazolyl-(2)]-α-(parachlorophenyl)-acetamide, and their salts. Moreover, these compounds are good muscle relaxants.

The new compounds are obtained by known methods. According to one method a lower tertiary amino-lower alkyl radical is introduced into the 1-position of the benzimidazole ring of an α-benzimidazolyl-(2)-α-phenyl-acetamide either directly or by stages. In this manner an α-benzimidazolyl-(2)-α-phenylacetamide can be reacted with a reactive ester of an alcohol of the formula

in which A has the meaning defined above and R represents a lower tertiary amino group, or a radical convertible into such group, e.g. a hydroxyl group, and in the resulting compound containing a radical convertible into a lower tertiary amino-lower alkyl group said radical is so converted, for example a hydroxyl group by chlorination and subsequent reaction with a secondary amine. Reactive esters are more especially those of strong inorganic or organic acids such as those of hydrohalic acids or organic sulfonic acids, such as para-toluenesulfonic acid. The introduction is preferably performed in the presence of a condensing agent, more especially one that is capable of forming metal salts with α-benzimidazolyl-(2)-α-phenylacetamide, such as the alkali or alkaline earth metals, for example sodium, lithium, calcium, their amides, hydrides, hydrocarbon compounds, alcoholates, oxides or hydroxides, e.g. sodamide, sodium hydride, sodium oxide or hydroxide, lithium butyl, potassium phenyl, lithium phenyl, potassium tertiary butylate or potassium tertiary amylate, or with the use of the preformed metal salts of the benzimidazole compound.

According to another process the benzimidazole ring substituted by a phenyl-carbamyl-methyl radical in the 2-position is formed by subjecting to ring closure an ortho-(Y—NH—)-aniline or a suitably N-substituted derivative thereof, in which Y represents a lower tertiary amino-lower alkyl group or a radical convertible thereinto, such, for example, as the β-chloroethyl group. The radical convertible into the lower tertiary amino-lower alkyl group is then subsequently converted into this group; in the case of the β-chloroethyl group, for example, this is achieved by reaction with diethylamine. In this manner an ortho-(lower tertiary amino-lower alkyl-amino)-aniline can be subjected to direct or stepwise ring closure with an α-carbamylphenylacetic acid or with a reactive functional derivative thereof, more especially an ester with an alcohol that is easily to split off or with an imino ether. To prepare the final products of the present process it is also possible to condense with a phenyl-acetaldehyde or a functional derivative thereof instead of with a phenylacetic acid, the product formed then being oxidized.

Alternatively, the new compounds are obtained when in a 1-(lower tertiary amino-lower alkyl)-2-benzyl-benzimidazole a radical attached to the aliphatic carbon atom of the benzyl radical and convertible into a carbamyl group is so converted. A radical convertible into a carbamyl group is, for example, a free or reactive functionally converted carboxyl group, more especially an acid halide group, an acid ester group or nitrile group. The conversion is conducted in usual manner, e.g. by treatment with ammonia or with a primary or secondary amine, or by hydrolysis respectively.

Substituents in the phenyl- or benzimidazolyl radical of the products of the invention can be replaced by other groups for instance a hydroxy group by an etherified hydroxy group or a hydrogen atom by a nitro group.

The reactions according to the present invention are performed in the presence or absence of a diluent and/or condensing agent, if necessary at an elevated temperature, under atmospheric or superatmospheric pressure.

According to the reaction conditions employed the new compounds are obtained in the form of their free bases or of their salts. From the salts the free bases can be made in a such known manner. The latter, by being reacted with acids suitable for the formation of therapeutically useful salts, can be converted into salts, for example salts of hydrohalic acids, sulfuric acid, nitric acid, phosphoric acid, thiocyanic acid, acetic acid, propionic acid, oxalic acid, malonic acid, succinic acid, malic acid, methanesulfonic acid, ethanesulfonic acid, hydroxyethanesulfonic acid, benzenesulfonic or toluenesulfonic acid or of acids having therapeutic action.

The starting materials are known or can be made by known methods.

The invention further includes those modifications of the process in which the starting material is a compound obtained as an intermediate product at any stage of the process, and the remaining stage or stages are carried out. The new compounds can be used as medicaments in the form of pharmaceutical preparations containing them or their salts in conjunction with a pharmaceutical organic or inorganic, solid or liquid excipient suitable for enteral, parenteral or topical application. The excipient is made from substances that do not react with the new compounds such, for example, as water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, in the form of tablets, dragees, ointments, creams or in liquid form (solutions, suspensions or emulsions). They may be sterilized and/or contain assistants, such as preservatives, stabilisers, wetting agents or emulsifiers, salts for controlling the osmotic pressure or buffers. If desired, they may also contain further therapeutically useful substances.

The following examples illustrate the invention.

Example 1

8.8 grams of powdered sodamide are entered portionwise into a stirred suspension of 50 grams of α-benzimidazolyl-(2)-α-phenylacetamide in 500 cc. of absolute dioxane, and the mixture is refluxed until no more ammonia is liberated. At 60–70° C. 30 grams of diethylamino-ethyl chloride are then dropped in, and the whole is stirred on for 12 hours at the same temperature. Any residual sodamide is destroyed by the dropwise addition of glacial acetic acid. The reaction mixture is then evaporated in vacuo, the residue is taken up in 5 N-hydrochloric acid, and the solution is extracted with ether. The hydrochloric acid solution is rendered alkaline with aqueous ammonia and extracted with chloroform. The chloroform extract is washed with sodium carbonate solution, dried over magnesium sulfate and evaporated. Crystallization from ether yields α-[1-(β-diethylamino-ethyl)-benzimidazolyl-(2)] - α - phenylacetamide of the formula

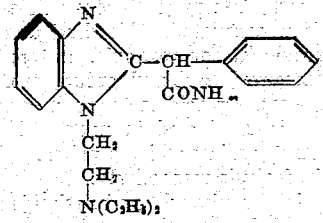

in the form of colorless crystals melting at 136–137° C. The hydrochloride is obtained by adding ethanolic hydrochloric acid to an ethanolic solution of the base, evaporation and crystallization from a mixture of ethanol and acetone; it melts unsharply at 150–160° C.

α-Benzimidazolyl-(2)-α-phenylacetamide, used as starting material, can be prepared as follows:

54 grams of ortho-phenylenediamine and 95 grams of phenyl-cyanoacetic acid ethyl ester are heated in a flask equipped with a descending condenser at 200° C. until no more alcohol and water pass over. The hot melt is diluted with ethylene glycol mono-ethyl ether, suctioned off, and washed with ethanol. The resulting product is benzimidazolyl-(2)-phenylacetonitrile forming colorless crystals melting at 199–200° C. 117 grams of this nitrile are stirred into 360 cc. of concentrated sulfuric acid. After having been kept for 16 hours at 25°, the mixture is slowly stirred into cooled aqueous ammonia. The precipitate, α-benzimidazolyl-(2)-α-phenylacetamide, is filtered off; after recrystallization from a mixture of chloroform and methanol it melts at 218–219° C.

Example 2

When the reaction described in Example 1 is performed with α-benzimidazolyl-(2)-α-(para-chlorophenyl)-acetamide, instead of with α-benzimidazolyl-(2)-α-phenylacetamide, and the working up is performed under otherwise identical conditions, α-[1-(β-diethylamino-ethyl)-benzimidazolyl-(2)]-α - (para-chlorophenyl) - acetamide is obtained in colorless crystals melting at 189–190° C. Its hydrochloride, prepared according to Example 1, melts at 174–175° C.

The α-benzimidazolyl-(2)-α-(para-chlorophenyl)-acetamide used as starting material can be prepared as follows:

In a stirring flask equipped with dropping funnel and descending condenser, closed with a calcium chloride tube, are mixed together sodium alcoholate prepared from 24 grams of sodium, 200 cc. of absolute toluene, 152 grams of para-chlorobenzyl-cyanide and 600 cc. of diethyl carbonate. The mixture is then subjected to slow distillation while being stirred, and at the same rate toluene (total 600 cc.) is added dropwise, with the distillation temperature rising from 80° to 110° C. When all the toluene has been added the mixture is stirred for 2 hours at 110° C. After cooling, ice water is added the reaction mixture is filtered, and the aqueous solution is immediately neutralized with glacial acetic acid, extracted with ether, the ethereal solution is washed with water, dried with magnesium sulfate, evaporated, and the residue is distilled under 0.12 mm. Hg pressure. The resulting product is para-chlorophenyl cyanoacetic acid ethyl ester boiling at 113–120° C. under 0.12 mm. Hg pressure.

54 grams of ortho-phenylenediamine and 112 grams of para-chlorophenyl-cyanoacetic acid ethyl ester are heated in a flask equipped with a descending condenser at 200° C. until no more ethanol and water pass over. The hot melt is diluted with ethylene glycol monoethyl ether, suctioned off and washed with ethanol and ether. Yield: 80 grams of benzimidazolyl-(2)-para-chlorophenyl acetonitrile in colorless crystals melting at 204–207° C. This nitrile is hydrolyzed as described in Example 1. The resulting α-benzimidazolyl-(2) - α - (para-chlorophenyl)-acetamide melts at 224–232° C.

Example 3

The reaction according to Example 1 is performed with α-benzimidazolyl-(2)-α-(meta-methoxyphenyl)-acetamide, instead of with α-benzimidazolyl-(2)-α-phenylacetamide, otherwise processing in identical manner, and α-[1 - (β-diethylamino-ethyl)-benzimidazolyl-(2)]-α-(meta-methoxyphenyl)-acetamide in colorless crystals melting at 153–154° C. is obtained; its hydrochloride, prepared as described in Example 1, melts at 162–164° C.

The starting material, α-benzimidazolyl-(2)-α-(meta-methoxyphenyl)-acetamide, can be prepared as follows:

54 grams of ortho-phenylenediamine and 109 grams of meta-methoxyphenyl cyanoacetic acid ethyl ester are heated in a flask equipped with a descending condenser at 200° C. until no more ethanol and water pass over. The melt crystallises on methanol being added and yields benzimidazolyl-(2)-meta-methoxyphenyl-acetonitrile melting at 137–139° C. 30 grams thereof are heated in 90 cc. of glacial acetic acid and 30 cc. of concentrated sulfuric acid for 2 hours at 90–100° C., the cooled solution is stirred into a cooled aqueous ammonia solution, and the precipitate is suctioned off. The product thus obtained in colorless crystals is a α-benzimidazolyl - (2) - α-(meta-methoxyphenyl)-acetamide melting at 147–148° C.

Example 4

7.2 grams of 2-(β-diethylamino-ethylamino)-5-nitraniline hydrochloride and 90 cc. of glacial acetic acid are added at room temperature to the phenylmalonic acid monoamide imino ether hydrochloride obtained from 12.0 grams of α-phenyl-α-cyanoacetamide and 4.3 cc. of absolute ethanol in 100 cc. of chloroform by introducing dry hydrochloric acid gas at 0 to 20° C., stirring for 16 hours at 25° C. and evaporation under diminished pressure, and the mixture is stirred for 20 hours at 40–45° C. The reaction mixture is evaporated in vacuo, the residue taken up in aqueous hydrochloric acid, the acid solution is washed with chloroform and rendered alkaline with ammonia solution, extracted with chloroform, and the chloroform extract is washed with sodium carbonate solution, dried over magnesium sulfate, and evaporated. Crystallization from acetone yields α-[1-(β-diethylamino-ethyl)-5-nitro-benzimidazolyl-(2)]-α-phenylacetamide of the formula

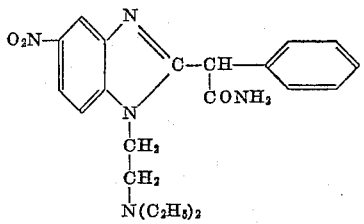

in the form of colorless crystals melting at 133–137° C. The hydrochloride is prepared by adding the calculated amount of ethanolic hydrochloric acid to an ethanolic solution of the base; it has a double melting point of 105–115° C. and 140–160° C.

*Example 5*

7.2 grams of 2-(β-diethylamino-ethylamino)-5-nitraniline hydrochloride and 90 cc. of glacial acetic acid are added at room temperature to the 4-chlorophenyl-malonic acid monoamide imino ether hydrochloride obtained from 14.6 grams of α-(4-chlorophenyl)-α-cyanoacetamide and 4.3 grams of absolute ethanol in 100 cc. of chloroform by introducing dry hydrochloric acid gas at 0 to 5° C., stirring for 16 hours at 25° C. and evaporating under diminished pressure. The whole is then stirred for 20 hours at 40–45° C. The reaction mixture is evaporated in vacuo, the residue taken up in aqueous hydrochloric acid, the acid solution is washed with chloroform and rendered alkaline with ammonia solution, extracted with chloroform, and the chloroform extract is washed with sodium carbonate solution, dried over magnesium sulfate and evaporated. Crystallization from a mixture of acetone and ether yields α-[1-(β-diethylamino-ethyl)-5-nitro-benzimidazolyl-(2)]-α-[4'-chlorophenyl]-acetamide in colorless crystals melting at 161–163° C. The hydrochloride, prepared by adding the calculated amount of ethanolic hydrochloric acid to an ethanolic solution of the base, melts at 150–155° C.

*Example 6*

1 gram of α-[1-(β-diethylamino-ethyl)-benzimidazolyl-(2)]-α-phenylacetonitrile is allowed to stand for 44 hours at 25° C. in 5 cc. of concentrated sulfuric acid, then slightly diluted with glacial acetic acid and poured into aqueous ammonia. Extraction with chloroform, drying over magnesium sulfate, evaporation and crystallization from ether yields α-[1-(β-diethylamino-ethyl)-benzimidazolyl-(2)]-α-phenylacetamide melting at 136–137° C.

α-[1 - (β - diethylamino-ethyl)-benzimidazolyl-(2)]-α-phenylacetonitrile used as starting material can be prepared as follows:

69.6 grams of benzimidazolyl-(2)-phenylacetonitrile are suspended in 800 cc. of absolute dioxane, 8.6 grams of powdered sodamide are entered in portions, and the whole is boiled with stirring until no more ammonia is liberated. Thereupon, 40.0 grams of diethylamino-ethyl chloride are added dropwise at 60° C., and the whole is stirred for 16 hours at 60° C. The reaction mixture is treated with glacial acetic acid, evaporated in vacuo, and the residue is extracted with aqueous hydrochloric acid, and the acid ethereal extract is rendered alkaline with concentrated ammonia. The solution is then extracted with chloroform, the chloroform extract washed with sodium carbonate solution, dried over magnesium sulfate and evaporated. The residue, crude α-[1-(β-diethylamino-ethyl)-benzimidazolyl]-α-phenylacetonitrile, is distilled at 190–210° C. under 0.1 mm. Hg pressure; the distillate crystallises from ether in the form of colorless needles melting at 106–108° C.

What is claimed is:

1. A member of the group consisting of benzimidazolylacetamides of the formula

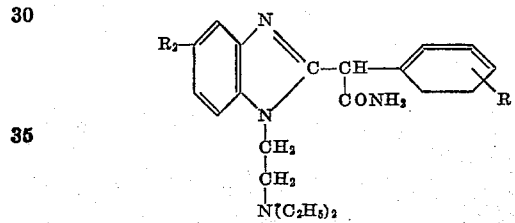

in which $R_1$ stands for a member of the group consisting of hydrogen, halogen, lower alkyl and lower alkoxy and $R_2$ for a member of the group consisting of hydrogen and and the nitro group, and therapeutically acceptable acid addition salts thereof.

2. α - [1-(β-diethylamino-ethyl) - benzimidazolyl-(2)]-α-phenylacetamide.

3. α - [1 - (β-diethylamino-ethyl)-benzimidazolyl-(2)]-α-(para-chlorophenyl)-acetamide.

4. α-[1-(β-diethylamino-ethyl)-5-nitro-benzimidazolyl-(2)]-α-phenylacetamide.

5. α-[1-(β-diethylamino-ethyl)-5-nitro-benzimidazolyl-(2)]-(para-chlorophenyl)-acetamide.

6. Therapeutically acceptable acid addition salts of α-[1-(β - diethylaminoethyl)-5-nitro-benzimidazolyl-(2)]-α-phenylacetamide.

No references cited.

UNITED STATES PATENT OFFICE
CERTIFICATION OF CORRECTION

Patent No. 2,944,062                          July 5, 1960

Karl Hoffmann et al.

It is hereby certified that error appears in the above numbered patent requiring correction and that the said Letters Patent should read as corrected below.

Column 2, line 60, for "in a such" read -- in as such --; column 3, lines 45 to 48, the right-hand portion of the formula should appear as shown below instead of as in the patent:

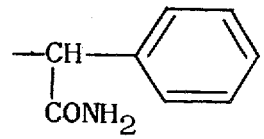

column 4, line 67, for "is a α-" read -- is α- --; column 6, lines 31 to 34, the right-hand portion of the formula should appear as shown below instead of as in the patent:

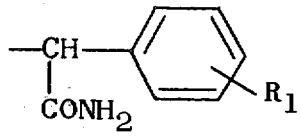

Signed and sealed this 23rd day of May 1961.

(SEAL)
Attest:

ERNEST W. SWIDER
Attesting Officer

DAVID L. LADD
Commissioner of Patents